US008873951B2

(12) United States Patent
Gutin et al.

(10) Patent No.: US 8,873,951 B2
(45) Date of Patent: Oct. 28, 2014

(54) TECHNOLOGY FOR SIMULATING AND/OR CONTROLLING COMMUNICATION OPTICAL NETWORKS

(75) Inventors: Michael Gutin, Petach-Tikva (IL); Alexander Velder, Petach-Tikva (IL); Lior Tourgeman, Petach-Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 692 days.

(21) Appl. No.: 13/169,303

(22) Filed: Jun. 27, 2011

(65) Prior Publication Data
US 2012/0002966 A1 Jan. 5, 2012

(30) Foreign Application Priority Data

Jun. 30, 2010 (IL) .......................... 206722

(51) Int. Cl.
H04B 10/08 (2006.01)
H04B 17/00 (2006.01)
H04B 10/00 (2013.01)
H01S 3/00 (2006.01)
H04J 14/02 (2006.01)
H04Q 11/00 (2006.01)

(52) U.S. Cl.
CPC .... *H04J 14/0284* (2013.01); *H04Q 2011/0079* (2013.01); *H04Q 11/0062* (2013.01); *H04J 14/0221* (2013.01)
USPC ................ 398/38; 398/79; 398/173; 359/333

(58) Field of Classification Search
USPC .......................... 398/37; 359/333, 337.1, 349
See application file for complete search history.

(56) References Cited

U.S. PATENT DOCUMENTS

| | | | |
|---|---|---|---|
| 6,701,089 B1 * | 3/2004 | Goodwin et al. ................ | 398/79 |
| 6,724,526 B1 * | 4/2004 | Onaka et al. ................ | 359/337.1 |
| 7,330,652 B1 | 2/2008 | Maxham | |
| 2002/0080438 A1 * | 6/2002 | Beine et al. ................... | 359/110 |
| 2005/0208949 A1 | 9/2005 | Chiueh | |
| 2009/0059814 A1 | 3/2009 | Nixon et al. | |
| 2010/0111534 A1 * | 5/2010 | Veselka et al. .................. | 398/79 |

OTHER PUBLICATIONS

Akyamac, et al., "Optical Mesh Network Modeling: Simulation and Analysis of Restoration Performance", National Fiber Optic Engineers Conference, 2002, pp. 1408-1418.

* cited by examiner

*Primary Examiner* — David Payne
*Assistant Examiner* — Casey Kretzer
(74) *Attorney, Agent, or Firm* — Browdy and Neimark, PLLC

(57) ABSTRACT

A technique for controlling power of a network node in an optical mesh network, comprising: determining a number of optical paths ingressing or expected to ingress the node, determining capacity or expected capacity of each of the paths; calculating for each of the paths a virtual input power $P_{virtual}$, based on estimation of relative capacity of a specific path with respect to total capacity of all the paths; applying to the network node a power control mechanism, while utilizing a corresponding virtual input power $P_{virtual}$ as input power of any of the paths.

7 Claims, 2 Drawing Sheets

TECHNOLOGY FOR SIMULATING AND/OR CONTROLLING COMMUNICATION OPTICAL NETWORKS

FIELD OF THE INVENTION

The present invention relates to a technique for designing, constructing and/or simulating operation of communication optical networks, especially mesh networks and those which are expected to change with time due to new requirements.

BACKGROUND OF THE INVENTION

The main problem of all existing methods for designing or simulating a dynamic cross-connecting (XC) network is inability to provide a well-based, highly probable traffic matrix (i.e., a traffic prediction table for the network), which is usually unavailable at a design stage, and even at a given state of a real existing network.

The detailed traffic planning is usually impossible, and indeed—would such be possible, new methods for planning/designing/simulation would not be required.

U.S. Pat. No. 7,330,652B describes a technique for selecting optical amplifier placement in an optical network. In one embodiment an algorithm is used to eliminate from consideration optical amplifier configurations unlikely to have satisfactory minimum power characteristics. In one embodiment the quality of service of each configuration of the subset is analyzed to determine an optical amplifier placement configuration having a minimal number of amplifiers and a desirable quality of service. Such a solution speaks a little about simulating/planning a network as a whole.

US2005208949A describes a method for channel assignment in a wireless network, which includes determining a channel/route configuration, assignments and routing information for a plurality of network nodes based on providing a desired initial network cross-section throughput. The document also discusses determining a link capacity for each link between a plurality of node pairs, and modifying the route information of the channel/route configuration according to the link capacity. However, all that requires information about a more or less probable traffic matrix.

US2009059814A describes an interactive software-based network design tool that may be used to simulate and view the operation of a wireless mesh device network. The tool is supposed to allow a user to create a model of a wireless network, to input several design requirements, and automatically generate and view communication routes and schedules for the wireless network. The network design tool provides an interactive graphic interface for the addition, removal, and positioning of nodes and devices within the wireless network and a menu including several interactive screens for specifying threshold values, network topology selections, routing preferences, and other configuration parameters related to generating and optimizing communication routes and schedules within the wireless mesh network. The network design tool automatically applies a set of optimization rules along with the parameters input by user to the network model in order to generate efficient network configuration data. Again, for utilizing the method described in the document, a traffic matrix (having considered probability) should be provided in advance.

Ahmet A. Akyamec et al in the article "Optical mesh network modeling: simulation and analysis of restoration performance" present two approaches for estimating restoration latency performance (restoration times) in mesh networks—an analytical approach and a simulation approach. The article does not deal with estimating/planning/simulating optimal capacity of mesh networks.

OBJECT AND SUMMARY OF THE INVENTION

To fulfill the long felt need in a practical technique for designing/simulating/controlling optical mesh networks, the Inventors propose a method that allows effective designing and/or simulation and/or controlling of dynamic cross-connecting (XC) optical networks without detailed traffic planning.

The main condition for performing the desired simulation is providing, before the simulation, a general strategic assumption about traffic development in the network. Such an assumption can be performed by a network designer (either a human being or a control/simulation system).

In the process of designing/simulating a network, optical amplifiers, as well as OADMs and switches, are network nodes which are most problematic. The main difficulty, due to the dynamic character of the network, is setting the correct working point for any specific optical node (amplifier or other) without knowing exact number of channels to be handled/amplified, and without knowing the channel allocation of the handled signal.

The central idea of the proposed method is a) determining/setting an operational regime for any network node (amplifier, or other) in the designed network, based on the above-mentioned general strategic assumption about traffic development in the network, and b) controlling power of each specific network node/amplifier based on the operational regime determined using that strategic assumption.

The desired operational regime can be determined, for example, at the design stage of the network. However, it can be done during the network operation. The mentioned assumption may be formed as follows. A user/designer who orders, plans, simulates or actually, decides how the network will be controlled, usually does not know how to predict capacity and power parameters for a specific network node such as amplifier. Capacity is usually an attribute of a route/link, not of a node/amplifier. The user or the designer usually may know or imagine some popular routes in the network. Therefore, the user or the designer, as a rule, cannot select any judicious or optimal power parameters for a node, but may predict probable routes in the network. It should be noted that most probable routes in the network may also be determined (predicted) by a network management system NMS or another path finding system, thereby forming the required assumption.

For controlling power of a specific network node (an optical amplifier, OADM, switch), the Inventors propose utilizing, in a power control mechanism of the optical amplifier, a virtual power value $P_{virtual}$ per path in an optical amplifier instead of a real input power value ($P_{tot}$ per path in an amplifier). The Inventors propose that the virtual power $P_{virtual}$ be calculated for the node/amplifier, and per an ingress path, based on estimation of capacity of the paths which are expected to path through the node/amplifier.

Actually, determining the virtual power value $P_{virtual}$ per path for a specific optical node plays part of the general strategic assumption of the expected traffic (or traffic development) in the network, since it comprises relative (proportional) capacity estimation for the paths.

Formally, there is proposed a method for controlling power on a network node in an optical mesh network, comprising:
  determining a number of optical paths ingressing or expected to ingress said node, determining capacity or expected capacity of each of said paths;

calculating for each of said paths virtual input power $P_{virtual}$, based on estimation of relative capacity of said path with respect to total capacity of all said paths;

applying to the network node a power control mechanism, while utilizing a corresponding value of $P_{virtual}$ as an input power of each specific path of the mentioned paths.

Power control mechanisms, which can be used for controlling network nodes (amplifiers, etc.) according to the proposed technique, are known general power control mechanisms that every network has (these mechanisms usually form part of EMS—Element Management System—located in the network and controlling the network nodes).

As known to those skilled in the art, one of the most important power control functions is to set a proper output power for optical amplifiers that are used in an optical network. As accepted in all conventional techniques, the output power is usually a function of a number of optical and traffic parameters, the most important of which are: the total input power, a number of optical channels that are used at the specific moment, the accumulated input noise and the spectral allocation of the optical channels: $P_{out}=f(P_{in}, NOC, Noise, \{\lambda i\})$, where $P_{in}$ is the total input power of the path, NOC is the number of active channels in the path, Noise is the accumulated noise and $\{\lambda i\}$ is the vector that describes the spectral allocation of the input signal, Pout is power per optical channel at the amplifier's output, determined for that path.

According to the approach proposed by the Inventors, the value of $P_{out/ch}$ (Output power per optical channel) for a specific path is recommended to be calculated/simulated by taking into account the following parameters:

$$P_{out/ch}=f(P_{in,virtual}(i), NOC(i)_{worst\ case}, Noise, \{\lambda i\}_{worst\ case}),\qquad [1]$$

As can be seen, $P_{in,virtual}(P_{virtual})$ of that specific path (i) is used instead of the conventional $P_{in}$ (also called $P_{in,total}$). In addition, NOC and $\{\lambda i\}$ should be evaluated for the worst case scenario amongst all the paths that pass through the optical amplifier. The Inventors declare that if the $P_{out}$ ($P_{out/ch}$) is set using this new approach [1], all possible traffic development scenarios will be taken into account in the most optimal way and the network (even dynamically changing) will be controlled properly.

More specifically, the Inventors have performed a number of simulations and have proven that if, for each of the optical paths incoming a specific node/amplifier, the incoming power is selected as "$P_{in,virtual}$" (can be marked as $P_{virtual}$, $P_{virt}$) calculated as the Inventors propose below, the output power per channel will practically be maintained at a desired (optimal) level.

Moreover, it has been proven that the output power per channel will remain at a pre-selected optimal desired level $P_{out,desired}$ even when real parameters (number of channels NOC, etc) of the incoming paths change during operation. In other words, the routes/paths being estimated and powered according to the proposed method will be independent from one another and will practically not affect the output power per channel. By using $P_{virtual}$ instead of $P_{tot}$, the amplifier becomes properly designed and properly controlled for every path capacity that does not exceed a planned number of channels (considered the maximally possible for the path).

After the $P_{out}$ value is calculated/simulated for every path ingressing the node, the sum of the obtained $P_{out}$ values will automatically give the total power ($P_{tot}$) at the node's output.

The proposed technique therefore constitutes any of the following: a) a method of designing an optical mesh network; b) a method of simulating operation of an optical mesh network, c) a method of controlling power (such as output power per channel) for optical nodes in a mesh optical network, especially in a dynamic network.

The Inventors propose calculating $P_{virtual}$ of a current path incoming a specific network node, substantially close to the following equation [2]:

$$P_{virtual} = P_{tot} \frac{\sum_{All\ available\ paths} NOC}{W_i^*(NOC)_{Current\ path}} \qquad [2]$$

where $P_{tot}$ is the path's total input power. It should be noted that the $P_{tot}$ is a part of trivial network calculations, one of the main conventionally accepted parameters of a path.

Those skilled in the art understand that it can be preliminarily calculated for every path as a sum of powers of all the channels in the path.

$W_i$ is a weight coefficient characterizing capacity of the path and depending on type of channels, modulation format used by channels, on spectral distribution between channels, capacity per channel, quality of service, etc.

NOC—(number of channels) is a parameter of a specific path, being its "full capacity" or desired number of channels for the specific path.

"All available paths" means the determined planned paths that are expected to pass through the specific optical amplifier.

Note, that it may happen that $P_{virtual} \gg P_{tot}$

More specifically, the method comprises the following steps for determining the value of $P_{virtual}$ for a specific path passing via a specific optical node (say, such as amplifier):

Determining optical paths expected to pass via the specific optical node. An optical path should be understood as a common route for a number of optical channels.

Determining properties (parameters) of the mentioned optical paths. The most important properties are: path capacity being mainly characterized by the number of optical channels in the path, and also by type of the channels in the path, bit rate of every channel, and channels allocation' (such as spectral allocation, bandwidth allocation, etc). In a more general form, capacities of different paths can be weighted using a factor $w_i$ which is channels' characteristics dependent.

Determining the value of virtual power $P_{virtual}$, to be used for a specific path ingressing the specific node/amplifier substantially close to the expression given in [2].

The method also comprises determining the maximum possible capacity for every specific optical node (amplifier)—i.e., the maximal allowed number of channels—using the global characteristics of the network. Every network has such a technological limitation, which is usually 40 or 80 channels (but may be different). It is defined by specific equipment that is used in the network.

An additional (though practically important) condition of the method is that the total number of channels for all available paths in the amplifier must not exceed the maximal allowed number of channels:

$$\sum_{\substack{All\ available\\paths}} NOC < NOC\text{max} \qquad [3]$$

If the additional condition is somehow violated during the network operation, the maximum allowed number of channels will be used. The politics of dropping excessive channels is not discussed here (the decision may be made by an operator, a power control mechanism, a network management mechanism, etc.).

Upon determining the $P_{virtual}$, the method may comprise the following steps:

a) Calculating (simulating) the gain parameter of the amplifier (the gain value is used in the power control mechanism), by using the determined $P_{virtual}$;

b) Determining the output power per channel ($P_{output}$) for the power control mechanism, by using the determined $P_{virtual}$.

It has been found by the Inventors that, upon simulating the Gain per path, the obtained values of Gain appear to be similar to one another, and that the obtained value reflects the integral parameter of the amplifier's Gain we looked for. It happens due to the properties of the proposed equation [2] which takes into account mutual influence of the paths.

Advantages/features of the proposed method:
1. The method allows designing/simulating/controlling a dynamic mesh optical network (even a dynamic one) based only on preliminary traffic estimations.
2. Allows both short and long traffic provisioning.
3. Allows taking into account spectral distribution and channels types for every path by introducing a weight function. The weight function allows an operator/user to emphasize the paths according to their properties and the required path's quality of service.
4. Allows high level of automation at the simulation level, with saving the running time and minimized involvement of human resources.
5. As a result of the simulation, the information required for the power control and traffic provisioning becomes available. For example, using the proposed $P_{virt}$ and the calculated input signal parameters allows obtaining Gain value of the node, $P_{out/channel}$ per path, and $P_{tot\ output}$, OSNR output per path and per channel.
6. Allows performing such power control of optical nodes (say, amplifiers), which ensures maintaining the desired output power per channel, and reaching independence of paths in the network.

According to a further aspect of the invention, there is also provided an Element Management System EMS for at least one network element (say, an optical amplifier, switch or OADM), the EMS accommodating a power control mechanism and being capable of performing the above-described method, namely steps of:
calculating $P_{virt}$ for a number of incoming optical paths, each having its given capacity determined at least by a number of channels NOC;
simulating operation of the network element by utilizing the $P_{virt}$ calculated for said optical paths, so as to obtain a predetermined desired output power per optical channel, and one or more required parameters of the network element (for example, Gain, OSNR, etc.)
performing power control on the network element, based on the simulation results.

Still a further aspect of the invention is a software product allowing performance of the described simulation and power control in a network element. It can be a software product comprising computer implementable instructions and/or data for carrying out the described method, stored on an appropriate computer readable storage medium so that the software is capable of enabling operations of said method when used in a computer system.

The software product may be a separate program interacting both with EMS and NMS (network management system). However, the software product may be part of EMS or NMS.

DETAILED DESCRIPTION OF PREFERRED EMBODIMENTS

Figure 1:
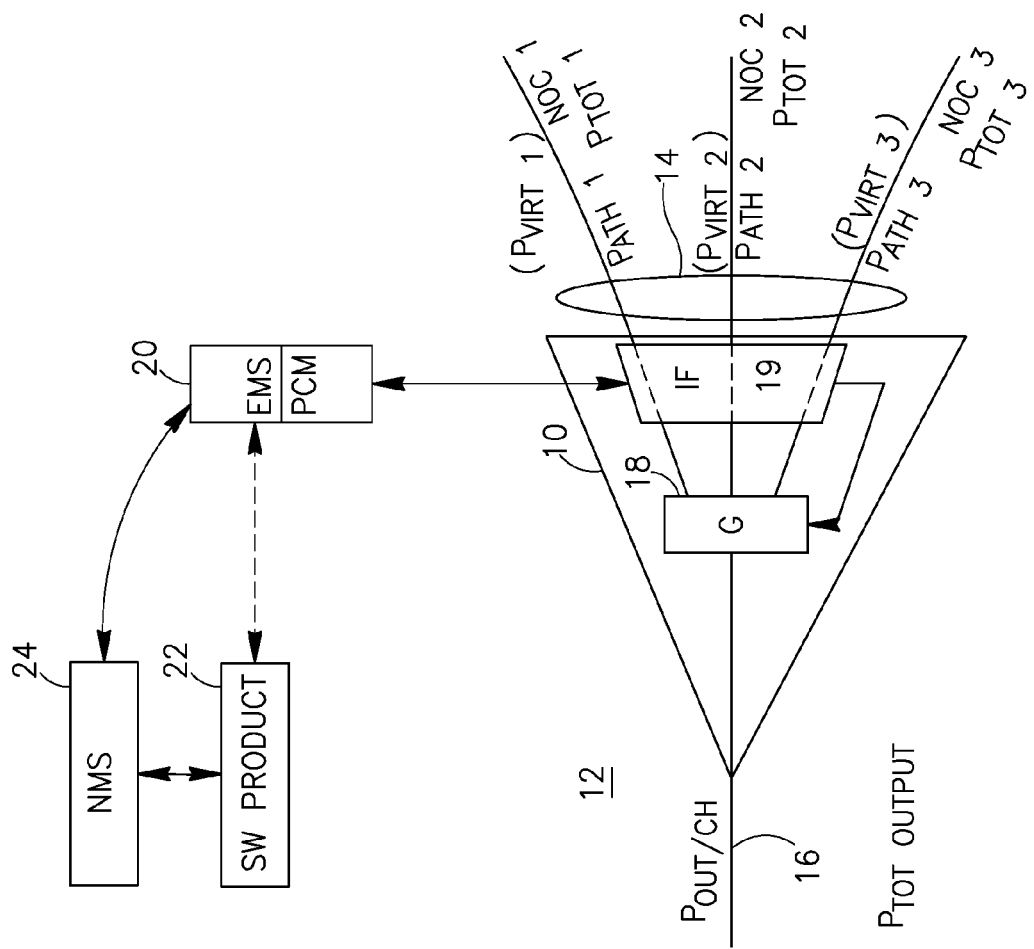
FIG. 1 illustrates the concept of the invention on an example of a specific optical amplifier in a mesh network.

FIG. 1 shows an optical amplifier 10 being a node in an optical mesh network 12. Actually, instead of the amplifier there may be another network element (OADM, switch) controlled by EMS 20 to perform power control. The amplifier 10 is connected to an input optical fiber schematically shown as 14, and to an output optical fiber schematically shown as 16. The amplifier's gain is schematically shown as a box G marked 18. Let a network designer has information that the amplifier 10 is expected to receive maximum three communication paths (Path 1, Path 2 and Path 3), and these paths will probably have the following capacity: they will comprise no more than the number of optical channels NOC1, NOC2, NOC3, respectively. Let, in the ideal case, the amplifier 10 should amplify any of the received optical channels so as to provide a desired total output power $P_{out}$ total. It is selected in advance, and is usually the maximal possible value as understood to those skilled in the art.

The Inventors propose that the network element 10, via its interface 19 using suitable protocols, be controlled by an Element Management System 20 comprising a power control mechanism (schematically shown as a box PCM), in cooperation with a proposed software product 22.

The software product is adapted to perform the following operations for example, with respect to an optical amplifier:
preliminarily ensuring calculation of the basic parameter $P_{tot}$ for each of the determined paths 1, 2, 3 (say, the paths can be determined by NMS);
calculating capacities NOC1, NOC2, NOC3 and values of $P_{virt}$ for the determined optical paths 1, 2, 3 respectively,
simulating the network node's (in a specific case, the amplifier's) operation for the calculated values of $P_{virt}$, and obtaining parameters required for designing and/or controlling the node, for example: $P_{out/channel}$ per each path incoming the node, Gain per path, $P_{tot-output}$ and the total Gain; Optical Signal to Noise Ratio OSNR per path, OSNR total can be obtained using any known model of amplifier;
initiating power control of the network element (amplifier 10) by the EMS, based on the obtained parameters.

More specifically, the Inventors propose performing the following operations for controlling an optical amplifier (or other network element that participates in the power control performed by EMS):
1. Calculate the total number of channels that will pass through the element (all the paths that pass through the element must be taken into account)
2. In order to guarantee the proper work and the correct parameters simulation for every optical path, any path performance is calculated when its total input power is replaced by its virtual input power $$P_{virtual} = P_{tot} \frac{\sum_{\substack{All\ available\\ paths}} NOC}{W_i \cdot (NOC)_{Current\ path}}, \quad [2]$$

where $W_i$ is the weight function that describes path properties.

The weight function preferably satisfies the following relation $$\sum_{\substack{All\ available\\ paths\ i}} W_i = 1$$

The weight function allows relative estimation of a specific path's influence on other paths, and is a function of optical channels' type, bit rate, quality of service, etc.

The weight function allows an operator/user/NMS to emphasize the paths according to their properties and the required path's quality of service.

The gain which is used in the power control mechanism is calculated/simulated relatively to the $P_{virtual}$, for each path; the way of calculation (except of the fact that it uses $P_{virtual}$ instead of $P_{tot,\ input}$) is understood to those skilled in the art.

For example, conventional models of an optical amplifier (for example, a model described in ITU-T G.692 standard recommendation) allow calculation of the following typical output parameters:

$$P_{out}(\lambda) = P_{in}(\lambda) + G(\lambda)$$

$$N_{out}(\lambda) = 10 \cdot \log\ [h \cdot v \cdot \Delta v \cdot G(\lambda) \cdot NF(\lambda) + N_{in}(\lambda) \cdot G(\lambda)]$$

$$OSNR_{out}(\lambda) = P_{out}(\lambda) - N_{out}(\lambda) = P_{in}(\lambda) - 10 \cdot \log\ [h \cdot v \cdot \Delta v \cdot NF(\lambda) + N_{in}(\lambda)]$$

Where P and N are optical power and noise respectively, $\lambda$ is the wavelength, G is the component gain, h is the Plank's constant, v is the carrier frequency, $\Delta v$ is the spectral window, in which the noise is measured and NF is the component Noise Figure. $P_{in}(\lambda)$ is the power per channel in a certain path, so $P_{in,tot}$ of the path is the sum of $P_{in}(\lambda)$'s with some small correction that noise contribution should be taken into account. Both the gain and the Noise Figure are the functions of the component working point, which is set mainly by the Pin total. The Inventors' solution comprises taking $P_{virtual}$ instead of $P_{tot}$ per incoming path, and thus provides output parameters' values that are suitable for multiple path operation.

In other words, the power per channel ($P_{out/ch}$), which is determined for the power control mechanism, is calculated relatively to the $P_{virtual}$ ($P_{virt}$) using a model of the amplifier (node); actually, the utilized model forms part of the Function f in the equation [1].

Path validity estimation may also be performed by simulating and adjusting its parameters, if necessary (for example, in case when interaction of the path with other paths causes problems). As was mentioned before, the optical simulation of the path is made relatively to the $P_{virt}$.

The Inventors have carried out a number of simulations for network nodes of mesh networks, and have proven that if the path simulation and the power control operation are performed as described above one can operate independently all the simulated paths within the simulation capacity assumptions.

Figure 2:
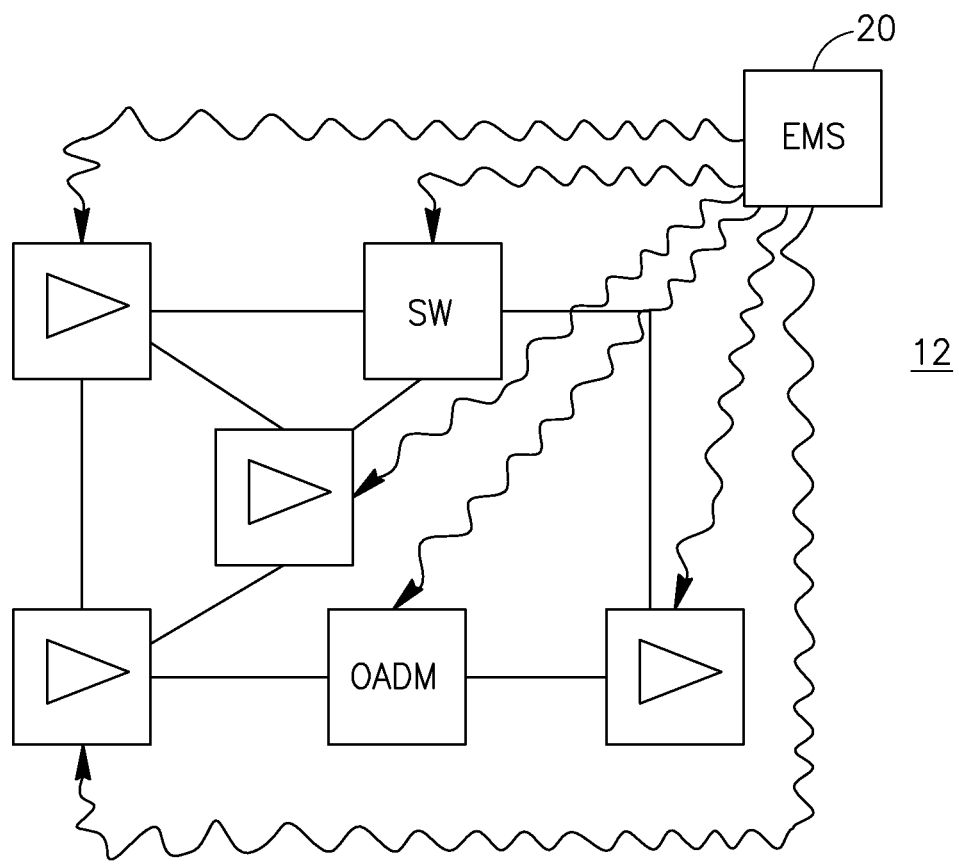
FIG. 2 schematically shows an Element Management System controlling network nodes in a mesh network.

FIG. 2 illustrates an optical mesh network 12 constituting a number of interconnected network nodes which comprise optical amplifiers (shown as triangles), optical add drop multiplexers (OADM), optical switches (SW), and other network nodes (not shown). The network nodes are controlled by an Element Management System EMS which accommodates a Power Control Mechanism PCM (not shown). In this specific example, the EMS incorporates the proposed software product according to the invention.

It should be appreciated that other versions of the proposed method for controlling/simulating/designing of an optical network may be suggested, and additional embodiments of the proposed EMS can be constructed, which should be considered part of the invention as far as defined by the claims which follow.

The invention claimed is:

1. A method for controlling power of a network element in an optical mesh network, comprising:
setting a plurality of optical paths to be optical paths that ingress said network element;
estimating a capacity of traffic to be conveyed along each of said plurality of optical paths;
calculating for each of said plurality of optical paths, a virtual input power $P_{virtual}$ based on estimation of its relative capacity of traffic to be conveyed there-along with respect to a total capacity of traffic to be conveyed along all of said plurality of optical paths; and
adjusting by a power controller, output power of at least one of said plurality of optical paths egressing from said network element, wherein said output power adjustment is determined based upon the virtual input power $P_{virtual}$ of the respective optical path.

2. The method according to claim 1, further comprising a step of determining an output power $P_{out}$ for each active channel of each of said plurality of optical paths at the network element egress, wherein the determination of the $P_{out}$ for each active channel is based upon the $P_{virtual}$ of a respective optical path, a number of channels in said respective optical path, spectral allocation, and the noise level at said network element.

3. The method according to claim 1, further comprising determining $P_{virtual}$ of an optical path ingressing said network element, as being substantially close to the value derived from the following equation:

$$P_{virtual} = P_{tot} \frac{\sum_{\substack{All\ available\\ paths}} NOC}{w_i (NOC)_{Current\ path}},$$

where $P_{tot}$ is the i-th path's total input power, preliminarily calculated for the optical path;

$W_i$ is a weight coefficient characterizing capacity of traffic to be conveyed along active optical channels in the optical path;

NOC—(number of channels) is the parameter characterizing a capacity of traffic conveyed along all active optical channels comprised in the optical path;

All available paths are the optical paths that ingress or are expected to ingress the network element.

4. The method according to claim 1, wherein the step of calculating the $P_{virtual}$ for each of said plurality of optical paths comprises:

determining parameters of each optical path, comprising at least capacity of traffic to be conveyed along the respective optical path, expressed by a number of active channels thereat;

determining the maximal possible capacity of traffic to be conveyed from said network element, as being the maximal allowed number of channels; and ensuring that a total number of channels for all available paths associated with the network element does not exceed the maximal possible capacity of traffic to be conveyed from said network element.

5. The method according to claim 1, wherein the network element is an optical amplifier, and the method further comprising:

using at least one calculated $P_{virtual}$ to determine a Gain of the optical amplifier.

6. An Element Management System (EMS) configured to control a network element in an optical mesh network, the EMS accommodating a power controller being capable of performing at least the following operations:

calculating $P_{virtual}$ for each of a number of incoming optical paths, each optical path having its given capacity of traffic to be conveyed there-along determined at least by a number of active channels NOC (NOC);

simulating operation of the network element by utilizing the $P_{virtual}$ calculated for each of said incoming optical paths, so as to obtain a predetermined desired output power per optical channel $P_{out}$, and one or more required parameters of the network element; and performing power control on the network element, based on the simulation results.

7. A software product stored on a non-transitory computer readable medium comprising computer implementable instructions and/or data for carrying out the method according to claim 1.

* * * * *